United States Patent [19]

Inoue et al.

[11] 4,213,596
[45] Jul. 22, 1980

[54] WHEELED, OVERHEAD WIRE INSTALLING APPARATUS

[75] Inventors: Motozo Inoue; Mitsuzo Kumeta; Hideo Ueno; Yoshinao Okamura; Tadashi Suzuki, all of Utsunomiya, Japan

[73] Assignee: Fuji Jokogyo Kabushiki Kaisha, Tokyo, Japan

[21] Appl. No.: 17,016

[22] Filed: Mar. 2, 1979

[30] Foreign Application Priority Data

Oct. 30, 1978 [JP] Japan .................................. 53-132648

[51] Int. Cl.$^2$ ............................................ B65H 59/00
[52] U.S. Cl. ................................ 254/134.3 R; 254/397; 254/413
[58] Field of Search ............... 254/134.3 R, 134.3 PA, 254/190 R; 242/86.5 R; 104/1 R

[56] References Cited

U.S. PATENT DOCUMENTS

| | | | |
|---|---|---|---|
| 1,275,501 | 8/1918 | Turanycz | 254/134.3 PA |
| 3,871,621 | 3/1975 | Jackson | 254/134.3 PA |

FOREIGN PATENT DOCUMENTS

| | | | |
|---|---|---|---|
| 286371 | 2/1914 | Fed. Rep. of Germany | 254/134.3 PA |
| 526889 | 5/1931 | Fed. Rep. of Germany | 254/134.3 R |
| 1379791 | 1/1975 | United Kingdom | 254/134.3 R |

*Primary Examiner*—Nicholas P. Godici
*Attorney, Agent, or Firm*—Martin A. Farber

[57] ABSTRACT

A trolley wire is paid out under tension from a drum on a traveling railroad car and is guided by a guide roller device on a following car to be hung by temporary hangers on a previously installed messenger wire, the guide roller device having a cradle rotatably supporting several transverse horizontal rollers and vertical rollers which respectively form a horizontal guide surface and two opposed vertical guide surfaces of large radii of curvature to prevent permanent bend sets in the trolley wire. The cradle is rockably supported on transverse pivot pins so that it can swing and optimally adapt to changes in the wire direction, and the mechanism thus supporting the cradle is also movable in the up-and-down directions and the in the transverse left-and-right directions.

5 Claims, 8 Drawing Figures

WHEELED, OVERHEAD WIRE INSTALLING APPARATUS

BACKGROUND OF THE INVENTION

This invention relates generally to apparatuses for installing overhead conductor wires above and along railroads and more particularly to a wheeled, overhead wire installing apparatus for installation of overhead conductor wires of electrified railroads.

In wire installation of this kind known heretofore, any set or tendency of an overhead wire, such as a trolley wire, drawn out of a drum to retain its coiled curvature is removed by imparting to a certain extent a stretching tension to the wire. In this case, the trolley wire drawn out from the drum is led out through an overhead wire guide roller mechanism, which has a horizontal transverse guide roller which bears the trolley wire and vertical guide rollers for guiding the trolley wire from the two lateral sides. Unless the diameters of these guide rollers are large, a firm permanent set in bending in the horizontal and vertical directions will be imparted to the trolley wire thus guided over the circumferential surfaces of the guide rollers and led out. However, if diameters of the guide rollers are made large enough to avoid this permanent bending set, the guide roller mechanism will become tremendously large and with be impractical.

In order to solve this problem, an overhead wire guide roller mechanism in which a large number of guide rollers of small diameter are so arranged that, in combination as a whole, they form a horizontal guide surface and a vertical guide surface of large radii of curvature has been proposed as disclosed in the specification of Japanese Utility Model Application Laid Open No. 121795/1976. In this guide roller mechanism, since guide surfaces of large radii of curvature are formed by small-diameter guide rollers, there is afforded an advantage in that a small-size mechanism provides guide surfaces of large radii of curvature.

In this guide roller mechanism, however, since the entire guide roller mechanism is provided in an immobile state, variations occur in the angle with which the trolley wire is introduced into the guide roller mechanism, when the mechanism is raised or lowered, thus changing the difference between the heights of the trolley wire supply drum and the guide roller mechanism. As a consequence, even if the guide roller mechanism is adjusted in a certain state, the attitude of the horizontal guide surface of the guide roller mechanism will become unsuitable as the work platform supporting the guide roller mechanism ascends and descends, whereby undesirable bending sets or deformations will be imparted to the trolley wire.

On one hand, since this guide roller mechanism is mounted on the same car as the trolley wire drum from which the trolley wire is drawn out, the size of the work platform supporting the guide roller mechanism is limited, whereby the work efficiency is relatively low.

SUMMARY OF THE INVENTION

It is an object of this invention to provide an overhead wire installing apparatus on wheels in which the above described difficulties have been overcome.

A specific object of the invention is to provide a wheeled, overhead wire installing apparatus in which an elevatable work platform of ample work space is provided on at least one work car.

Another object of the invention is to provide a wheeled, overhead wire installing apparatus in which a guide roller device for guiding an overhead wire, such as a trolley wire, drawn out from a drum is swingably supported on each work platform and thereby automatically assumes an optimal angular attitude for guiding the wire without imparting a severe bend thereto.

Still another object of the invention is to provide a wheeled, overhead wire installing apparatus as stated above in which the overhead wire passed over each work platform is so guided that it continually passes immediately above and along the longitudinal centerline of the work platform, whereby high work efficiency is afforded.

According to this invention, briefly summarized, there is provided an overhead wire installing apparatus comprising a wire stretching car rotatably supporting a drum around which an overhead wire is wound, at least one work car coupled to the rear of the wire stretching car, and locomotive means for driving the above named cars, each work car having a raisable and lowerable work platform which is provided at the front end thereof and substantially on the longitudinal centerline of the work car with an overhead wire guide roller device adapted to guide the overhead wire drawn out of the drum, the guide roller device comprising: a cradle; a plurality of horizontal guide rollers rotatably supported on the cradle with horizontal rotational axes perpendicular to the longitudinal centerline of the work car in positions to form, in combination, within the cradle a curved horizontal guide surface of a large radius of curvature in a vertical plane passing through the centerline such that a bending set will not be imparted to the overhead wire, the horizontal guide surface bearing the wire in rolling contact; a plurality of vertical guide rollers rotatably supported on the cradle in positions to form, in combination, two opposed vertical guide surfaces having a large radius of curvature in a horizontal plane such that a bending set will not be imparted to the wire and disposed on opposite lateral sides of the wire thus borne on the horizontal guide rollers; and a support structure swingably supporting the cradle on the work platform by means of pivot pins having a common horizontal axis perpendicular to the work car centerline, the cradle being thus swingably supported at a part thereof higher than the horizontal guide rollers, whereby the cradle is stably supported and automatically adapts to an optimal attitude relative to the wire thereby to prevent bending sets therein.

The nature, utility, and further features of this invention will be more apparent from the following detailed description with respect to a preferred embodiment of the invention when read in conjunction with the accompanying drawings, throughout which like parts are designated by like reference numerals and characters.

DETAILED DESCRIPTION

Figure 1:
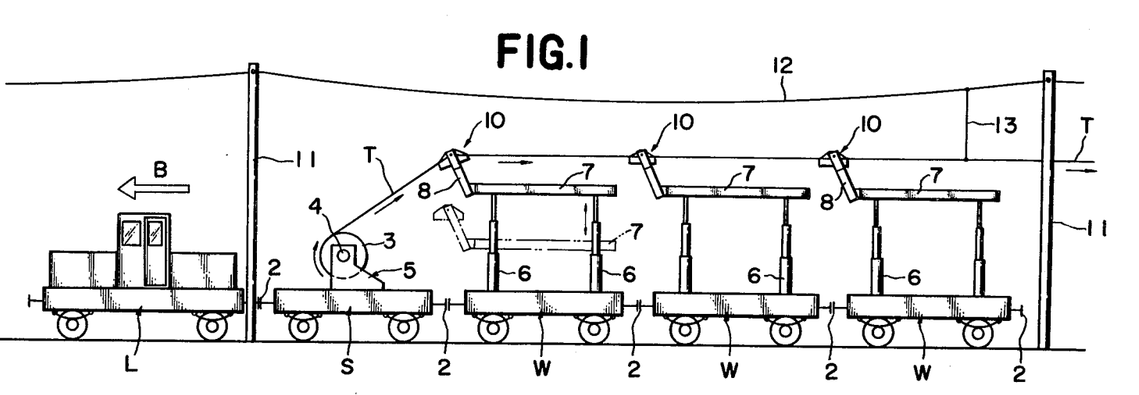
FIG. 1 is a left side elevation showing in entirety an example of the wheeled, overhead wire installing apparatus according to this invention in its operational state.

Referring to FIG. 1, the wheeled, overhead wire installing apparatus of this invention is a train of railroad cars on rails, comprising a locomotive L in the leading position, a wire stretching car S, and at least one work car W, coupled by couplers 2 in the sequence named. In the illustrated embodiment of the invention, the locomotive L is provided separately from the wire stretching car S, but it is also possible to provide the wire stretching car with motive power means so that it can operate as a towing car. In the illustrated embodiment, the locomotive L tows the following cars in the arrow direction B.

The wire stretching car S has a support base 5 mounted on the car chassis and rotatably supporting an overhead wire drum 3 by way of a shaft 4. An overhead wire, for example, a contact conductor wire or trolley wire T, drawn out from the wire drum 3 is supplied relatively to the train in the direction opposite to the direction B of advance of the train.

Each work car W has a work platform 7 which can be raised and lowered by means such as hydraulic cylinders 6. A pair of support arms 8 are mounted to extend obliquely forward and upward on the forward end of the work platform 7 or the end nearest the wire stretching car S. The support arms 8 at their forward upper ends swingably supports an overhead wire guide roller device 10. The overhead wire T (which will hereinafter be referred to as a trolley wire since the example illustrated relates to a trolley wire) drawn out from the wire drum 3 is guided by the guide roller device 10 as described hereinafter.

As the train advances, the trolley wire T thus paid out is hung by a worker on the work platform 7 by means of temporary hangers 13 on a suspension wire (also known as a messenger wire) 12 stretched between support poles 11. The extreme outer or rear end (not shown) of the trolley wire T is fixed at a suitable position to the right as viewed in FIGS. 1 and 2. The train is controlled to travel at low speed in the direction B as braking force is applied by means described hereinafter to the wire drum 3 counter to rotation thereof in the trolley wire paying out direction. In this manner, the trolley wire T can be paid out under a tension force maintained at a constant value.

Figure 2:
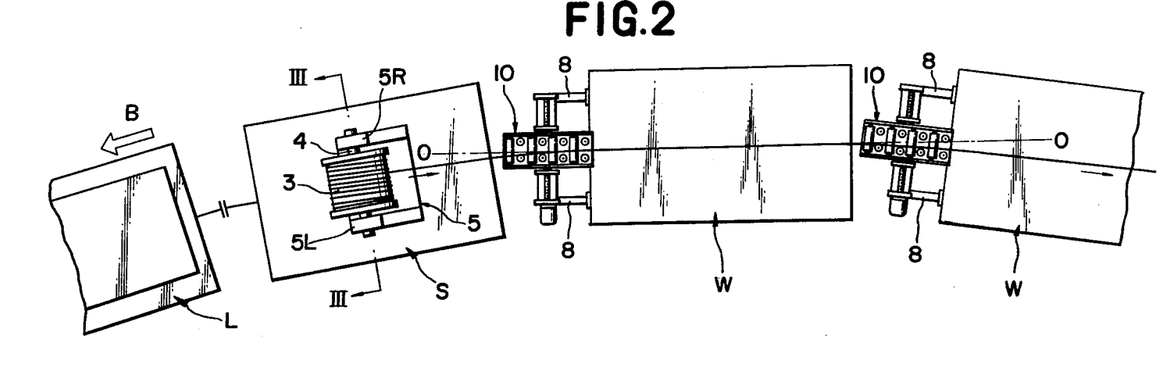
FIG. 2 is a relatively enlarged plan view showing a portion of the railroad train constituting the apparatus shown in FIG. 1.

The state of the overhead wire installing train shown in FIG. 1 wherein it is traveling along a curved part of the track is shown as a relatively enlarged plan view in FIG. 2. As is apparent from this figure, the overhead wire guide roller device 10 of a work car W is so supported by the support arms 8 of that work car that it is above the longitudinal centerline 0—0 of that work car. In this connection, as described more fully hereinafter, the guide roller device 10 is supported between the pair of support arms 8 in a state wherein it can be controllably moved in a horizontal direction perpendicular to the longitudinal direction of the work car W. When this guide roller device 10 is at the position exactly midway between the two support arms 8, this device 10 is exactly on the longitudinal centerline of the car. Since the support arms 8 extend obliquely forward and upward, the guide roller device 10 is positioned substantially above the coupler 2 at the front end of the work car W.

Figure 3:
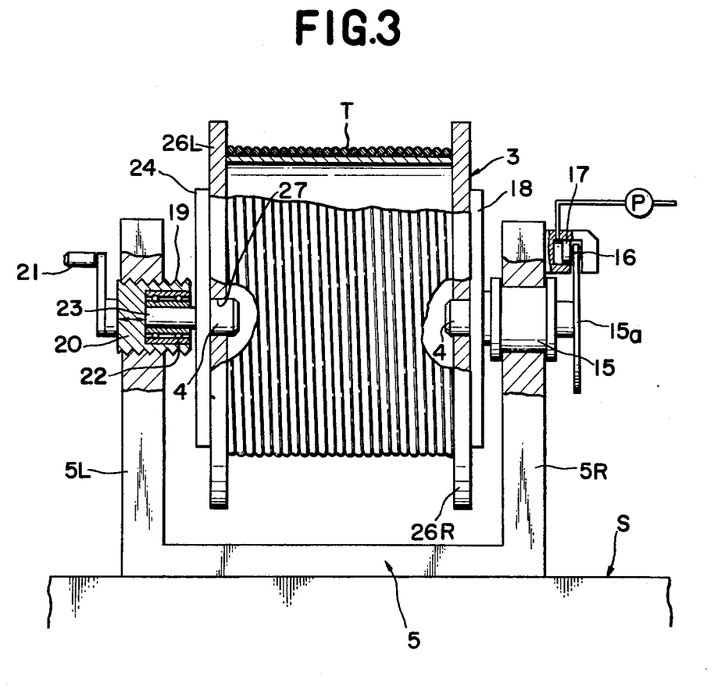
FIG. 3 a further enlarged rear elevation partly in section taken along the plane indicated by line III-III in FIG. 2 as viewed in the arrow direction, showing an overhead wire drum and its support mechanism in the same apparatus.

The details of the aforementioned wire drum 3 and support base 5 are shown in FIG. 3, which is a partial sectional view taken along the plane indicated by line III—III in FIG. 2.

The support base 5 has two upright frame members 5L and 5R, one of which, 5R, rotatably supports a journal 15 having at its inner end a shaft pin 4, for the drum 3, coaxial and integral therewith. A disc 15a is secured unitarily and coaxially to the outer end of this journal 15. A braking force can be applied to this disc 15a by way of a lining pad 16 and a hydraulic piston 17 subjected to hydraulic pressure supplied by a hydraulic pump P. Accordingly, a braking force can be constantly applied to the shaft pin 4. A holding arm 18 in contact with a flange 26R of the drum 3 is further formed on the journal 15.

The other upright frame member 5L of the support base 5 supports a bearing holder 20 screwed horizontally into the member 5L at a position coaxial with the above described journal 15 and pin 4. By turning a handle 21 fixed thereto, this bearing holder 20 can be moved horizontally in advancing and receding movements relative to the support base 5. A bearing 22 is fitted coaxially in this bearing holder 20 and rotatably supports a journal 23 having on its inner side a shaft pin 4 coaxial and integral therewith. This journal 23 also has a holding arm 24 integrally secured thereto and contacting the other flange 26L of the drum 3.

The above mentioned two flanges 26R and 26L of the drum 3 have respective central holes 27 through which the above mentioned opposite shaft pins 4 are inserted in the inward direction. When a drum 3 is to be dismounted from the support base 5, the handle 21 is turned to move the journal 23 toward the left as viewed in FIG. 3 together with the bearing 22 and bearing holder 20 thereby to extract the shaft pin 4 of the journal 23 out of the central hole 27 of the flange 26L and to permit the drum 3 to be removed. Subsequently, a new drum 3 is so mounted that the central of its right flange 26R fits onto the shaft pin 4 integral with the journal 15, and then the shaft pin 4 on the left side is inserted into the central hole 27 of the left flange 6L by turning the handle 21.

Figure 4:
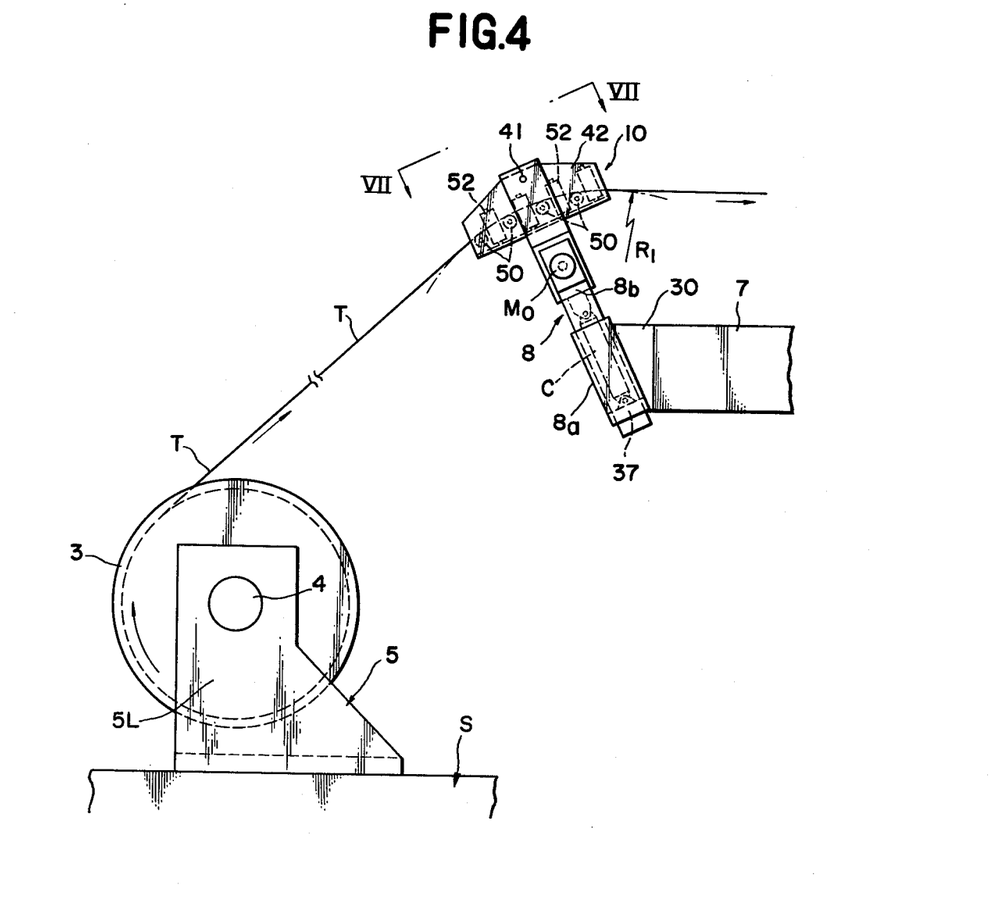
FIG. 4 is a relatively enlarged left side elevation showing the relationship between the overhead wire drum and an overhead wire guide roller device mounted on the leading work car of the train.

The guide roller device 10 mounted on the forward upper end of the support arms 8 at the front end of the work platform 7 of each work car W is shown on a somewhat enlarged scale in FIG. 4. The lower base end of each support arm 8 is mounted on the work platform 7.

Figure 5:
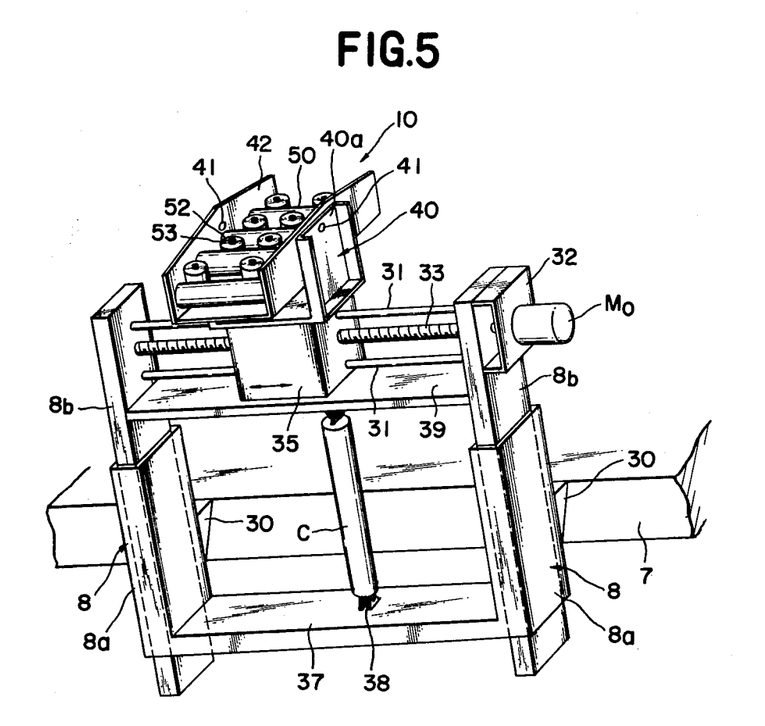
FIG. 5 is a further enlarged perspective view of the overhead wire guide roller device and its supporting mechanism.

As shown in FIG. 5, each pair of support arms 8 are spaced apart in the horizontal transverse direction. Each arm 8 comprises a fixed part 8a fixed by a mounting member 30 to the work platform 7 and a movable arm 8b inserted in a freely slidable or telescopable manner in the fixed part 8a and thereby being guided by the fixed part 8a. The movable arms 8b extend upward past the upper ends of their fixed arms 8a and support therebetween upper and lower guide rods 31 directed horizontally and transversely and fixed at their ends to the movable arms 8b. A driving device such as a hydraulic motor Mo, for example, is mounted by way of a bracket 32 on the upper part of a movable arm 8b on one side (right side as viewed in FIG. 5) and is coupled by a coupling 36 (FIG. 6) to a screw shaft 33 disposed parallel to the guide rods 31 and rotatably supported at its two ends by the movable arms 8b.

Figure 6:
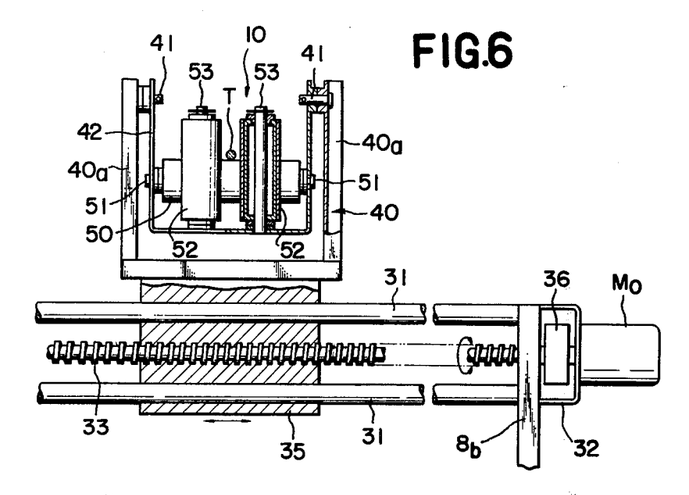
FIG. 6 is a relatively enlarged front elevation, with some parts shown in vertical section, of the guide roller device and its supporting mechanism.

The two guide rods 31 slidably support a carriage block 35 supporting thereon the overhead wire guide roller device 10. As shown in FIG. 6, this carriage block 35 has an internal screw meshed with the above mentioned screw shaft 33. Accordingly, the carriage block 35, together with the guide roller device 10 mounted thereon, can be moved transversely toward the right or the left along the guide rods 31 by the rotation of the motor Mo.

Referring again to FIG. 5, the lower or base ends of the fixed support arms 8a are rigidly connected by a crosspiece 37. The movable support arms 8b at their parts below the carriage block 35 are rigidly connected by a transverse bridge 39. A hydraulic cylinder device C is pivotally connected at its lower end by pivot means 38 to the upper central part of the crosspiece 37 and at its upper end by another pivot means to the lower central part of the bridge 39. Accordingly, extension and contraction of the hydraulic cylinder device C cause the movable arms 8b, together with the guide roller device 10 and related parts supported on the movable arms, to move up and down.

As shown in FIGS. 5 and 6, a channel-shaped support bracket 40 is fixedly mounted at its web part on the upper surface of the carriage block 35, the flanges of the support bracket 40 extending upward to constitute left and right upright support parts 40a. An overhead wire guide roller cradle 42 also of channel shape is pivotally supported at its middle upper part by coaxially disposed pivot pins 41 on the upper parts of the upright support parts 40a of the support bracket 40. Accordingly, the guide roller cradle 42 can swing freely about the pins 41.

Figure 7:
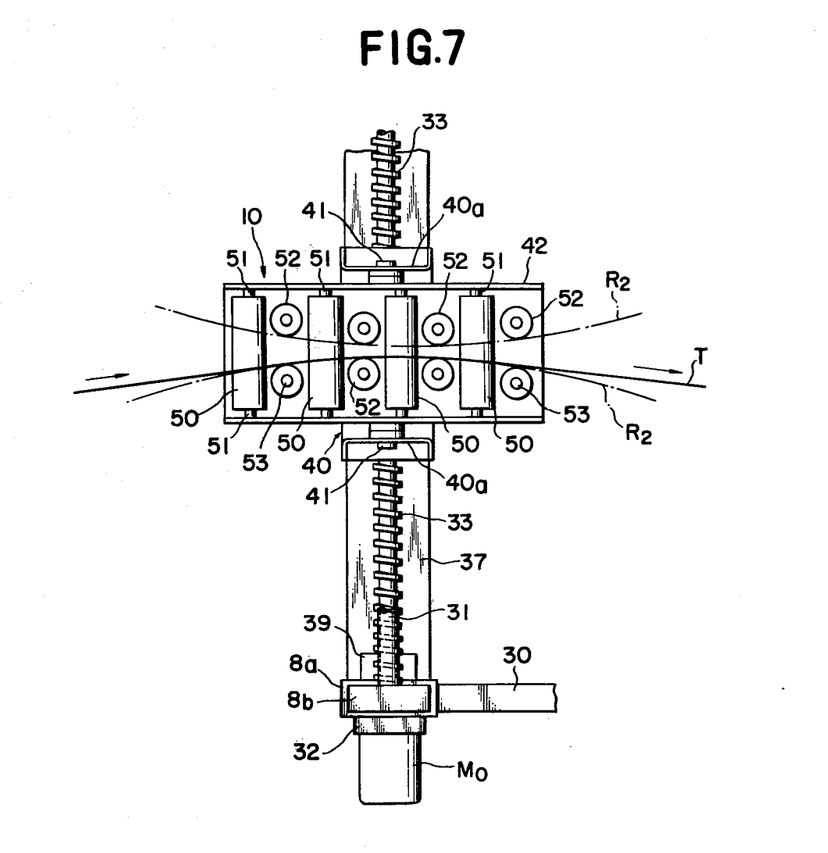
FIG. 7 is a top view as indicated by line VII—VII in FIG. 4.

The constructional arrangement of the wire guide rollers within the cradle 42 is shown in FIGS. 6 and 7. A number (four in the illustrated embodiment) of horizontal guide rollers 50 are rotatably supported at spaced-apart positions by respective roller shafts 51 on the upright support parts 40a of the cradle 42. These horizontal guide rollers are mutually parallel and have centerlines which are directed horizontally in the transverse direction, that is, perpendicular to the longitudinal direction of the work car. The positions of these horizontal guide rollers 50 in the height direction with respect to the cradle 42 is as shown in FIG. 4. More specifically, these rollers 50 are so positioned in the height direction that an imaginary curved surface contacting the upper surfaces of all rollers 50 is a partial cylindrical surface of a radius of curvature of $R_1$. This radius $R_1$ of curvature is set at a value such that a permanent deformation or set in bending or curvature, as viewed in the vertical plane in which the trolley wire T guided in contact with the upper surfaces of the rollers 50 lies, is not imparted to the trolley wire T. This is an important feature of this invention.

In the cradle 42, vertical guide rollers 52 are further provided. These rollers 52 are rotatably supported on respective roller shafts 53 imbeddedly fixed to the bottom or web part of the cradle 42. Pairs of left and right vertical guide rollers 52 are arranged alternately in the car longitudinal direction with the horizontal guide rollers 50. The vertical guide rollers 52 on either of the left and right sides are so positioned in the transverse direction that an imaginary curved surface contacting the inner surfaces of all rollers 52 is a partial cylindrical surface of a radius of curvature of $R_2$, the convex sides of the imaginary curved surfaces on the left and right sides facing each other. The radius $R_2$ of curvature is set at a value such that a permanent set in bending or curvature, as viewed in plan view, is not imparted to the trolley wire T in contact with and guided by these vertical guide rollers 52.

The overhead wire installing apparatus of the above described construction according to this invention is controllably operated as described below.

The free end of the trolley wire T drawn out from the drum 3 of the wire stretching car S is passed through the guide roller device 10 of the first work car W and then through those of any succeeding work cars W, if any, and is then anchored to some fixed object such as a support pole. Then with the drum 3 in a braked state, the locomotive L is driven in the arrow direction B at a specific low speed, whereupon the trolley wire T is paid out toward the rear, successively passing through the guide roller devices 10, under a constant tension proportional to the braking force on the drum 3. During this operation, the work platform 7 of each work car W is adjusted to a height which is most suitable for the work of suspending the trolley wire T from the suspension wire 12 by a succession of temporary hangers 13 as mentioned hereinbefore.

As shown in FIGS. 4, 6, and 7, the trolley wire T is so passed through each guide roller device 10 that the trolley wire T contacts the upper surfaces of the horizontal guide rollers 50 and, at the same time, passes between the left and right vertical guide rollers 52, thereby being fully guided. When the overhead wire installing train is traveling along a straight-line stretch of track, the trolley wire T also passes merely in a straight line between the vertical guide rollers 52 on the left and right sides. However, when the train enters a curve, for example, toward the left in the direction of travel as shown in FIG. 2, the trolley wire T contacts the inner surfaces of the vertical guide rollers 52 on the left side along an arcuate path of a radius of curvature of $R_2$ as shown in FIG. 7 and is thus guided in the transverse direction. When the track curves in the opposite direction, the trolley wire T shifts transversely to the opposite side and is thus guided by the vertical guide rollers on the opposite side.

In any case, since the guide roller device 10 is disposed on or near the longitudinal centerline of the work platform 7, the trolley wire T paid out toward the rear and guided by the guide roller device 10 passes along the longitudinally central part of the work platform 7 not only when the train is traveling along a straight stretch of the track but also when it is traveling along a curve in the track. Accordingly, the work of the worker on the work platform is facilitated.

In this connection, it is to be noted that it is necessary to install the trolley wire T with alternate left and right displacements deviating from the centerline of the track at the support poles 11 in order to prevent concentrated local wear of the pantagraphs of electric trains which contact the trolley wire and collect power. For this reason, the suspension or messenger wire 12 is also similarly installed. In accordance with this invention, the work of installing the trolley wire T with the temporary hangers 13 on the suspension wire 12 is facilitated with respect to such deviations by causing the guide roller device 10 to undergo up-and-down and left-and-right displacements conforming to the height and transverse deviations of the suspension wire 12. These displacements of the guide roller device 10 are attained by appropriate control of the aforedescribed hydraulic cylinder C and hydraulic motor Mo.

Figure 8:
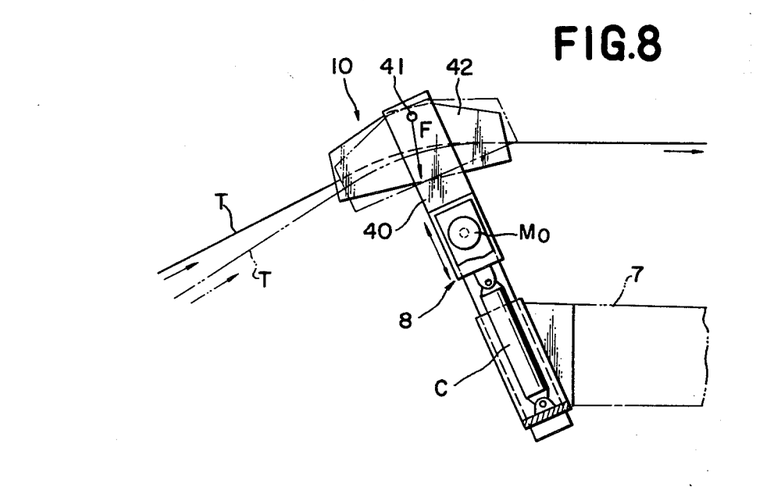
FIG. 8 is a left side elevation of the overhead wire guide roller device indicating an operation action thereof.

On one hand, the angle with which the trolley wire T is introduced into the guide roller device 10 differs with the up-and-down movement of the guide roller device 10 and the height of the work platform 7. When there is such a fluctuation of the trolley wire entrance angle, however, the cradle 42 of the guide roller device 10 pivots freely about the pins 41 as indicated in FIG. 8 thereby to function as an equalizer mechanism. More specifically, even when the paying-out direction of the trolley wire T from the drum 3 of the wire stretching car S varies abruptly because of a change in a difference between the heights of the drum 3 and the guide roller device 10 of the leading work car W, the cradle 42, holding the guide rollers of the guide roller device 10, pivots and is aligned in the direction F in which the resultant force of the trolley wire tension forces act, the cradle 42 coming to rest at an angular position of equilibrium.

Accordingly, the trolley wire passes smoothly along a curved surface of a large radius $R_1$ of curvature formed by the horizontal guide rollers 50 as it causes these rollers to roll, without acquiring a permanent set due to forcible sharp bending at the guide rollers, and is thus guided to the guide roller device of the following work car. Moreover, the overhead wire installing apparatus provided by this invention affords easy and highly efficient wire installing work.

What we claim is:

1. A wheeled, overhead wire installing apparatus comprising a wire stretching car rotatably supporting a drum around which an overhead wire is wound, at least one work car coupled to the rear of the wire stretching car, and locomotive means for driving the above mentioned cars, each work car having a raisable and lowerable work platform which is provided at the front end thereof and substantially on the longitudinal centerline of the work car with an overhead wire guide roller device adapted to guide the overhead wire drawn out of the drum, said wire guide roller device comprising:

a cradle;

a plurality of transverse horizontal guide rollers rotatably supported on the cradle in positions to form in the cradle a curved horizontal guide surface of a large radius of curvature in a vertical plane passing through said centerline such that a bending set will not be imparted to the overhead wire, the horizontal guide surface bearing the wire in rolling contact;

a plurality of vertical guide rollers rotatably supported on the crade in positions to form two opposed vertical guide surfaces having a large radius of curvature in a horizontal plane such that a bending set will not be imparted to the wire and disposed on opposite lateral sides of the wire thus borne on the horizontal guide rollers; and support means swingably supporting the cradle on the work platform by means of pivot pins having a common transverse horizontal axis and passing through the cradle at a part thereof higher than the horizontal guide rollers, whereby the cradle is stably supported and automatically adapts to an optimal attitude relative to the wire thereby to prevent bending sets therein.

2. A wheeled, overhead wire installing apparatus according to claim 1 in which the pivot pins are supported by support arms extending upward from the front end of the work platform of each work car.

3. A wheeled, overhead wire installing apparatus according to claim 2 in which the support arms are extendable and contractable, and have driving means for extending and contracting the support arms thereby to move the overhead wire guide roller device in displacement along the longitudinal direction of the support arms.

4. A wheeled, overhead wire installing apparatus according to claim 2 in which the support arms comprise a pair of left and right spaced-apart support arms disposed on a transverse line and joined by at least one transverse guide rod supported at the ends thereof by the support arms and slidably supporting the overhead wire guide roller device, and driving means is provided for causing the guide roller device to undergo sliding transverse displacement along the guide rod.

5. A wheeled, overhead wire installing apparatus according to claim 4, comprising a carriage block slidably supported on said at least one transverse guide rod, and a support bracket integrally secured to said carriage block and having upright members, said cradle being swingably supported by the pivot pins on and between said upright members.

* * * * *